Patented Feb. 19, 1935

1,991,765

UNITED STATES PATENT OFFICE 1,991,765

ALDEHYDE-HYDROGEN SULPHIDE REACTION PRODUCT

Barnard M. Marks, Arlington, N. J., assignor to Dupont Viscoloid Company, Wilmington, Del., a corporation of Delaware No Drawing. Application January 23, 1932, Serial No. 588,488

18 Claims. (Cl. 260—17)

This invention relates to aldehyde-hydrogen sulphide reaction products and the production thereof, and more particularly it relates to compositions having the property of forming useful resins when condensed with certain other substances.

One object of the invention is to provide new compositions of matter. A further object is to provide compositions formed by the interaction of hydrogen sulphide and an aldehyde. A further object is to provide compositions having the property of forming useful resins when condensed with certain other substances. A further object is to provide methods for the manufacture of compositions of the character indicated. To these ends and also to improve generally on compositions and methods of the desirable character indicated, the invention consists in the various matters hereinafter described and claimed.

In preferable general accordance with the invention hydrogen sulphide is added to an aqueous solution of an aldehyde, preferably formaldehyde, the solution being of neutral, acid or alkaline reaction represented by a pH between 2 and 12, and the temperature being preferably between substantially 20° C. and substantially 100° C. when the reaction is carried out under atmospheric pressure. When the reaction is carried out under pressures above atmospheric the temperature limits may be varied in accordance with the pressures used. Under these conditions carried out as exemplified in the examples hereinafter given, the formaldehyde and hydrogen sulphide react to give the products of the present invention. If the solution is saturated with hydrogen sulphide a solid product is produced; and if less hydrogen sulphide is added than is necessary to saturate the solution, there result solutions rather than solid products, but which have, like the solid products, the property of forming useful resins with certain other substances, e. g. urea.

Although a good and useful product is obtained with a solution having a pH anywhere within the indicated limits, it is preferable to use a pH between 4 and 7.5. Commercial formalin, having a pH of about 4.5, is satisfactory. The rate of absorption of the hydrogen sulphide increases rapidly with increase in temperature because of the temperature coefficient of the rate of its reaction with formaldehyde. Therefore, although the reaction proceeds at temperatures below 20° C., the rate of reaction is, generally speaking, too slow for practical operation, and, therefore, I prefer to operate not substantially below 20° C. When operating at temperatures substantially above 60° C. the physical and chemical properties of the resulting product are less readily controlled, than when operating below this temperature. The most suitable temperature for operation is, I have found, between 40° C. and 50° C.

The solid product is soluble in various organic solvents, e. g. chloroform, ethylene dichloride, propylene dichloride and toluene. It is only slightly soluble in water and may be crystallized from hot water. It is a stable product and exhibits characteristics of a complex structural compound. It condenses very readily with certain substances, e. g. urea, to form useful resins. The densities and refractive indices of the above mentioned partially saturated solutions indicate the formation of stable complexes in situ.

Without restricting the invention thereto, it is illustrated by the following examples.

I

Into 30 g. (1 gram mol.) of formaldehyde (provided by 80.5 g. of a freshly made formaldehyde solution, 37% by weight of formaldehyde), the solution having a pH of 6 to 7, hydrogen sulphide gas was passed at such a rate that it was fully absorbed (i. e. without escape of excess hydrogen sulphide). The absorption was accompanied by a noticeable heat of reaction so that a rise in temperature took place from room temperature (20° C.) to about 40° C. in the reaction vessel. The reaction was carried on under atmospheric pressure and continued until there was no further absorption of hydrogen sulphide and the reaction mass had become saturated with hydrogen sulphide, giving the crude product a white, pulverulent, amorphous solid. For substantially complete saturation about 22 g. (0.65 g. mol.) of hydrogen sulphide was required. Three crystallizations of this crude product from chloroform gave a white almost odorless crystalline compound, having a melting point of 80° C. (uncorrected) and containing 51.5% sulphur.

II

Into 30 g. (1 gram mol.) of formaldehyde (provided by 81.0 g. of formalin solution containing 37% by weight of formaldehyde), the solution having a pH of 4 to 4.5, hydrogen sulphide gas was passed. The reaction was carried on under atmospheric pressure and continued at 50° C. until the reaction mass had become saturated with hydrogen sulphide. For substantially complete saturation, about 22 g. of hydrogen sulphide was required. Regarding the pH of the solution, 4 to 4.5 is the pH of commercial formalin. Therefore, when it is desired to use solutions of formalin of the pH indicated it is unnecessary to add reagents to adjust the same. The reaction product was a white, pulverulent, amorphous solid.

III

In this case 0.81 kilo of commercial formalin of pH 4 to 4.5 was treated with 0.22 kilo of hydrogen sulphide. Procedure was in general as in Example II, except that the solution was warmed to 40° C. and the hydrogen sulphide was forced into the solution under pressure (somewhat less than two atmospheres), the solution being contained in an autoclave. The reaction was completed at about 100° C. Upon the completion of the reaction the pressure was released and any excess hydrogen sulphide recovered. The reaction product was a white, pulverulent, amorphous solid.

IV

In this instance to the formalin solution, 0.81 kilo, was added sufficient ammonium sulphide (15 g.) to give the solution a pH of 8 to 8.5. The solution was warmed (to 40° C.) and the hydrogen sulphide (0.22 kilo) was forced into the solution under pressure (somewhat less than two atmospheres), the solution being contained in an autoclave. The reaction was completed at about 60° C. The reaction product was a white, pulverulent, amorphous solid.

V

To 30 g. (1 gram mol.) of formaldehyde (provided by 81.0 g. of formalin solution containing 37% by weight of formaldehyde) 1 cc. of 0.75 N. hydrochloric acid was added which gave the resulting solution a pH of approximately 3. Hydrogen sulphide gas was passed into the formalin solution at such a rate that it was fully absorbed. During the thionation the temperature rose to about 35° C. and additional heat was added to maintain the temperature at 50° C. until completion. The reaction was carried on under atmospheric pressure and continued until the reaction mass had become saturated with the hydrogen sulphide. A white, pulverulent, amorphous solid product separated.

In cases where the reaction is carried on under pressure, as in Examples III and IV, and VI below, the pressure should be somewhat less than two atmospheres in order to avoid liquification of the hydrogen sulphide gas.

The crude solid products obtained by the various procedures given in the above examples may be purified from boiling chloroform. As above mentioned the product is useful as a resin forming constituent or intermediate, it being capable of being condensed with certain substances, e. g. urea to form resins.

As previously mentioned if less hydrogen sulphide is added to the formaldehyde solution than is necessary to saturate it, under the pH and temperature conditions specified, the resulting partially saturated solutions also have the property of forming useful resins with certain substances, e. g. urea. A lower content of sulphur is obtained by only partially saturating the formaldehyde solution, and the product is present in a clear or slightly turbid solution. It is often desirable to know the sulphur content of the solutions and/or to bring the solutions to a definite sulphur content, and the following example indicates the relation of density and refractive index of the solution to percentage of sulphur in the solution and in the composition of matter in the solution.

VI 0.81 kilo of commercial formalin solution contained in an autoclave was warmed to 40° C. and hydrogen sulphide was forced under pressure into the solution, the reaction being carried on under a pressure of somewhat less than two atmospheres. Samples of the solution were withdrawn at intervals and sulphur determined and the density and refractive index measured at 15° C. The results are shown in the following table:—

| Percentage sulphur in solution | Percentage sulphur in composition | Refractive index at 15° C. | Density at 15° C. |
|---|---|---|---|
| 2.15 | 5.6 | 1.38096 | 1.092 |
| 5.45 | 13.5 | 1.39000 | 1.097 |
| 12.26 | 27.4 | 1.41204 | 1.111 |
| 13.41 | 29.7 | 1.41690 | 1.114 |

By plotting the sulphur contents against refractive index and density against refractive index, straight line graphs result. By the use of these graphs, any sulphur content is known if the density and refractive index are determined. Consequently to obtain a definite sulphur content, hydrogen sulphide is passed into the formalin solution until the density and refractive index reach the values corresponding to the sulphur content desired.

As before mentioned, the pH of the solution may be of any value between and including 2.0 to 12.0, so that the solution may be neutral (pH 7.0) or acid or alkaline to the extent indicated. It will be understood that the pH of the reaction mass except in the extreme acid range, may change as soon as any hydrogen sulphide is added. Therefore, any pH's included, and as stated in the above examples are to be understood as those of the solution before any hydrogen sulphide is added.

Agents for adjusting the pH of the formaldehyde solution to reduce the acid reaction thereof may be any suitable bases such as sodium and potassium and ammonium hydroxides, or any salt such as the nitrates, chlorides, etc. It is generally desirable, however, to not use a compound which will discolor the product, such as ferric hydroxide, nickel nitrate, manganese chloride, etc. Within the limits specified, the exact pH of the solution is not of particular importance, and therefore in any of the above examples the pH may be varied from the particular pH given to any pH within the general limits mentioned (2.0 to 12.0) as by adding more or less of the adjusting agent, adding acid (e. g. formic acid) or using a formalin of greater acidity than the usual pH 4.0 to 4.5 (e. g. 3) without introduction of other changes into the examples.

For the sake of definiteness of description, and also because formaldehyde is preferable for various reasons, the invention has been described with more particular reference to formaldehyde. However, it is to be understood that polymers of formaldehyde e. g. paraformaldehyde and other aldehydes such as acetaldehyde, furfuraldehyde can be substituted for formaldehyde and products obtained analogous to the products obtained with formaldehyde.

Since the present compositions of matter are entirely new to the arts, the question of naming them arises. From a full consideration of nomenclature, the proper name is evidently "formthional". That is, since the new compositions of matter are derived from formaldehyde, contain a very substantial amount of sulphur and exhibit the properties of aldehydric compounds and since thioformaldehyde is meththional it follows that "formthional" is the correctly derived name for the new compositions of matter.

It will be understood that, in mentioning ranges of temperature and of pH as "between" certain limiting figures, the limiting figures are included in the stated range.

I claim:

1. The method which comprises reacting hydrogen sulphide and an aldehyde in an aqueous solution, having a pH between 2 and 12, at a temperature between substantially 20° C. and substantially 100° C.

2. The method as recited in claim 1 in which the aldehyde is formaldehyde.

3. The method which comprises reacting hydrogen sulphide and an aldehyde in an aqueous solution having a pH between 2 and 12, carrying on the entire reaction to completion without disassociation of the complex whose formation is initiated at the start of the reaction, and continuing the reaction until the mass is fully saturated with hydrogen sulphide, and the aldehyde fully thionated.

4. The method which comprises reacting hydrogen sulphide and an aldehyde in an aqueous solution having a pH between 3 and 8.5 at a temperature between substantially 40° C. and substantially 60° C.

5. The method which comprises reacting hydrogen sulphide and formaldehyde in an aqueous solution having a pH between 3 and 8.5 at a temperature between substantially 40° C. and substantially 60° C.

6. The method which comprises reacting hydrogen sulphide and formaldehyde in an aqueous solution having a pH between 3 and 8.5, carrying on the entire reaction to completion without disassociation of the complex whose formation is initiated at the start of the reaction, and continuing the reaction until the mass is fully saturated with hydrogen sulphide, and the aldehyde fully thionated, the entire reaction being carried on at a temperature between substantially 40° C. and substantially 60° C.

7. The method which comprises reacting hydrogen sulphide and an aldehyde in an aqueous solution having a pH between substantially 4 and substantially 7.5, and continuing the reaction without interruption until a product containing combined sulphur is produced.

8. The method as recited in claim 7 in which the aldehyde is formaldehyde.

9. The method which comprises reacting hydrogen sulphide and an aldehyde at a pressure above atmospheric and in an aqueous solution having a pH between 2 and 12.

10. The composition of matter formed by reacting hydrogen sulphide and an aldehyde in an aqueous solution, having a pH between 2 and 12, at a temperature between substantially 20° C. and substantially 100° C.

11. The composition of matter formed by reacting hydrogen sulphide and formaldehyde in an aqueous solution, having a pH between 2 and 12, at a temperature between substantially 20° C. and substantially 100° C.

12. The composition of matter formed by reacting hydrogen sulphide and an aldehyde in an aqueous solution having a pH between 2 and 12, carrying on the entire reaction to completion without disassociation of the complex whose formation is initiated at the start of the reaction and continuing the reaction until the mass is fully saturated with hydrogen sulphide and the aldehyde fully thionated.

13. The composition of matter formed by reacting hydrogen sulphide and an aldehyde in an aqueous solution, having a pH between 3 and 8.5, at a temperature between substantially 40° C. and substantially 60° C.

14. The composition of matter formed by reacting hydrogen sulphide and formaldehyde in an aqueous solution, having a pH between 3 and 8.5, at a temperature between substantially 40° C. and substantially 60° C.

15. The composition of matter formed by reacting hydrogen sulphide and formaldehyde, at a temperature between substantially 40° C. and substantially 60° C., in an aqueous solution having a pH between 3 and 8.5, carrying on the entire reaction to completion without disassociation of the complex whose formation is initiated at the start of the reaction and continuing the reaction until the mass is fully saturated with hydrogen sulphide and the aldehyde fully thionated.

16. The composition of matter formed by reacting hydrogen sulphide and an aldehyde in an aqueous solution, having a pH between substantially 4 and substantially 7.5, and continuing the reaction without interruption until a product containing combined sulphur is produced.

17. The composition of matter comprising essentially a solid reaction product of formaldehyde and hydrogen sulphide, having a sulphur content of substantially 51.5% and a melting point of substantially 80° C.

18. The composition of matter formed by reacting hydrogen sulphide and formaldehyde in an aqueous solution, having a pH between 3 and 8.5, at a temperature between substantially 40° C. and substantially 60° C., said composition having a sulphur content of substantially 51.5% and a melting point of substantially 80° C.

BARNARD M. MARKS.